May 20, 1969    J. R. JOHNSON    3,444,925

STRUCTURAL ARTICLES AND METHOD OF MAKING

Filed Dec. 17, 1963

INVENTOR
JAMES R. JOHNSON
BY
Carpenter, Abbott, Coulter, & Kinney
ATTORNEYS

United States Patent Office

3,444,925
Patented May 20, 1969

3,444,925
STRUCTURAL ARTICLES AND METHOD OF MAKING
James R. Johnson, White Bear Lake, Minn., assignor to Minnesota Mining and Manufacturing Company, St. Paul, Minn., a corporation of Delaware
Continuation of abandoned application Ser. No. 26,372, May 2, 1960, which is a continuation-in-part of abandoned application Ser. No. 746,263, July 2, 1958, which is a continuation-in-part of application Ser. No. 657,503, May 7, 1957, now Patent No. 2,999,061. This application Dec. 17, 1963, Ser. No. 331,649
Int. Cl. F28f 3/00
U.S. Cl. 165—166                     21 Claims This application is a continuation of my application Ser. No. 26,372, filed May 2, 1960, now abandoned, which application is a continuation-in-part of my now-abandoned application Ser. No. 746,263, filed July 2, 1958, the latter being a continuation-in-part of my application Ser. No. 657,503, filed May 7, 1957, now Patent No. 2,999,061.

This invention relates to heat-resistant thermally-rigidified complex shapes and structural articles, and to methods for producing the same. More particularly, the invention is directed to rigid, sturdy, non-burnable, heat-unified, refractory, high-surface-area structural components having, as an essential part thereof, thin corrugated webs or films, and means for making such structural components.

Following the teachings of this invention, it is possible to fabricate ceramic heat exchangers of relatively minute size with a multitude of thin-walled passages which can withstand extraordinarily high temperatures without corrosion or erosion due to the effects of high temperature fluid media (e.g., gases or liquids). Heretofore, insofar as is known, sintered ceramic heat exchangers have been of relatively enormous size and thickness (e.g., brick recuperators or regenerators of glass tank furnaces), highly inefficient as heat exchangers largely because of their bulk, and have functioned primarily as heat storage or capacity elements. Heat-unified intricately-designed corrugated ceramic heat exchangers of this invention, on the other hand, permit rapid and efficient heat exchange, with controlled fluid media flow, as desired. In comparison with prior art heat-unified bodies of equal over-all dimensions and similar composition, bodies hereof are made extremely light in weight, and are many times more efficient as heat exchangers. In effect, the new order of design possibilities introduced into the ceramic art by this invention permits the formation of heat exchangers of comparatively minute size which function as efficiently or more efficiently than the bulky types heretofore available.

In many industrial establishments much heat is carried by waste fumes out into the atmosphere and is wasted. Some attempt has been made to capture such heat by passing fumes through heat exchangers formed of ductile metals, but of necessity such metal heat exchangers have been placed a distance from the source of combustion so as to prevent their destruction by the intense heat or corrosive atmospheres of combustion. Thus, their use has not permitted maximum capture of the heat from exhaust or waste fumes. Heat-unified ceramic heat exchangers of this invention may be placed in or adjacent to most sources of combustion common in industry, therefore permitting maximum extraction and utilization of heat from waste fumes; and efficient, highly responsive heat exchange is accomplished using my thin-walled intricate articles of corrugated web design.

A further illustration of a long-sought-after article, now realized by this invention, is a multipassaged, thin-webbed, heat-resistant support structure for catalysts. A structure of this type for use in catalytic oxidation of exhaust fumes from automobiles is an example. Such a structure should have a multitude of small passages of high surface area, be compact and relatively light in weight, and further should be capable of operation at the intense temperatures that exhaust fumes are discharged from a cylinder block without suffering undue corrosion. Heretofore, integrated or unified ceramic catalytic oxidizers made by conventional methods have been very bulky and have had an extremely low superficial or geometric surface area-to-volume (or mass) ratio. While metal structures formed of thin corrugated metal sheets satisfy many of the requirements aforedelineated, for oxidizers, they do not possess the necessary resistance to the corrosive effects of hot exhaust fumes, and are generally unsuitable as catalyst supports. Following the teaching of this invention, light-weight articles of high geometric surface-area and low volume may be fabricated so as to possess such required resistance to heat and corrosion.

This invention now makes possible light-weight, heat-resistant turbine blades, light-weight nuclear fuel elements and structures, as well as a host of other highly heat-resistant, light-weight structural articles of complex shape, e.g., corrugated outer shells for missiles to provide insulation and cooling passages, corrugated burner blocks for radiant gas burners, corrugated tubes (annular or longitudinal corrugations), etc. For the first time, insofar as I am aware, light-weight, very thin-walled, multiple-webbed, thermally-rigidified, complex, corrugated, non-burnable structures made from non-ductile, non-malleable, sinterable materials, with positive and secure bonds or structural joints between parts, are now possible. Structural joints between parts of the complex structures hereof are conveniently formed so as to be indistinguishable from the structure of thin-walled corrugated parts of the end article, which offers considerable advantage from the standpoint of total heat resistance of the end article as distinguished from weakness of temperature resistance such as those created by brazing corrugated ductile metal parts together. Thin-walled corrugated structures, while easily formed out of malleable and ductile metals and the like, have not heretofore been available out of brittle materials such as, for example, ceramics. In fact, the nature of ceramic materials militates against the possibility of using them to fabricate visual duplicates of thin corrugated metal structures.

As aforenoted, ceramics are brittle, whereas ordinary metals are ductile and malleable. A ceramic cannot be molded after firing, whereas malleable and ductile metals are easily shaped. Ceramics are known to maintain their strength at high temperatures, whereas heating of common metal objects to ceramic firing temperatures ordinarily causes them to corrode or melt or deform out of shape. In dealing with some common metals of relatively low melting point, forming can be accomplished under the heat conditions needed for fluidization or softening of the metal, and an article of desired shape or configuration can be formed directly in a die, whereas in the ceramic or refractory field, forming of the desired shape or configuration must generally be followed by a firing step to rigidify it to a hard and permanent state. Firing to the permanent hard and rigid state (e.g., the ceramic state) frequently involves shrinkage of the article, which is not a problem in shaping solid ductile and malleable metals.

Shrinkage of a ceramic during firing creates serious problems for the ceramic manufacturer. It is a problem in making extremely thin flat elements such as capacitors, since shrinkage is frequently accompanied by warpage. Thus, the firing of flat thin elements for capacitors has been accomplished between flat refractory plates, usually with a plurality of flat capacitor elements in a stack between such refractory plates, so as to prevent edge curling and warping of the capacitor elements during the sintering operation.

To some extent, the manufacture of such thin ceramic pieces for capacitors and similar end uses has been enhanced by the use of temporary organic binders to facilitate the formation of thin films of green ceramic for firing; but such has not eliminated need for control of shrinkage, warpage and curling in the firing operation.

In the firing of a thin film of organically-bonded or plasticized sinterable particles, the first significant loss of film strength occurs when the fugitive or temporary organic binder or carrier is volatilized, usually at a temperature below but up to about 500° C. At such point in the firing cycle the film is extremely fragile. The fragility of a thin film (such as hereinafter illustrated in the examples) from which the organic binder has been volatilized can be demonstrated by simply lighting a match to a sample of the film to burn out the organic binder. The resulting burned film is so fragile that it tends to flake and fall into minute particles when touched with a pencil. Not until subsequent heat-unification (e.g., as by sintering, which amounts to heat-unification of a particulate body into a hard, rigid permanent state by interfacial bonding between particles of which it is composed, without actual melting of the mass of particles themselves) is accomplished at relatively high temperatures (e.g., 1000° C. or more, for most ceramics) does the film again gain strength, and its strength after sintering is of quite a different type than that exhibited in the original film with organic binder present. Thus, it will readily be appreciated that the firing of a plurality of thin fragile films and webs in compound-curved shape, stacked on top of each other with a multitude of interspersed passages and structural configurations as well as joints to be preserved, is by no means to be expected to produce a coherent composite article of sound, predictable, structural features and integrity, with the pre-formed structural configuration preserved in the final article. Indeed, experience would indicate to the contrary, since unfired or green thin ceramic rods have been noted to sag when fired in a horizontal position with only the ends thereof supported. Surprisingly, however, I have discovered amazing preservation of structural features during firing of the shaped green corrugated articles hereof, and a new flexibility in the step of firing such articles.

It may be noted at this point that I am familiar with Cohen Patent No. 2,552,937, which sets forth that a ceramic heat exchanger may be formed by winding in overlapping convolutions upon itself a strip of material flat on one side and having projecting spacer vanes on the other side. The strip illustrated by Cohen is not corrugated as taught herein, and is rather massive in structure, with relatively thick spacer vanes and flat sections. The spacer vanes are necessarily thick in order to be formed as taught in the patent; and further must be relatively thick, in view of their straight projecting design, in order to possess the required strength in the green state for a spacer function. Also, no provision is made in the Cohen patent for positive bonding of the abutting projections to the flat side of the strip material; and the only apparent means for accomplishing a fired bond between such abutting surfaces in the patent appears to be that which might arise incidentally in the step of firing itself. Generally mere abutting surfaces of green ceramic do not bond together during the step of firing, as may readily be appreciated when it is realized that capacitor discs are frequently fired in stacked abutting relationship between refractory setter plates without interbonding between the capacitor discs. While scattered incidental bond areas arising during firing may be suitable for some regenerative heat exchangers, where gaseous escape from one chamber to another may not be harmful, they would be entirely unsuitable in a countercurrent or counterflow heat exchanger where the flow of one fluid media is to be maintained entirely separate from a different fluid media receiving or giving up heat to the other through the walls of the heat-exchanger chambers. Of course, relatively massive ceramic wall thicknesses further militate against satisfactory operation of devices such as counterflow heat exchangers where efficient and highly responsive heat exchange is required as temperature differentials change during operation.

Advantageously, compound-curved thin-webbed intricately-designed articles such as illustrated herein provide the art with new light-weight refractory articles highly versatile in use applications, retaining many of the advantages of articles formed by brazing intricate designs of ductile and malleable metal webs together, while at the same time avoiding the disadvantages of brazed metal web articles as well as the limitations of ceramic design and fabrication as taught in the prior art. As aforestated, the thin-webbed articles hereof surprisingly retain their structural configuration during firing even though past experience with thin green ceramic webs would indicate that warpage would be essentially uncontrollable in the absence of firing the webs between refractory surfaces holding the webs in the shape of the final desired article.

Structural aspects and features of the sintered articles of this invention will be described and illustrated by reference to a drawing, made a part hereof, wherein.

Figure 1:
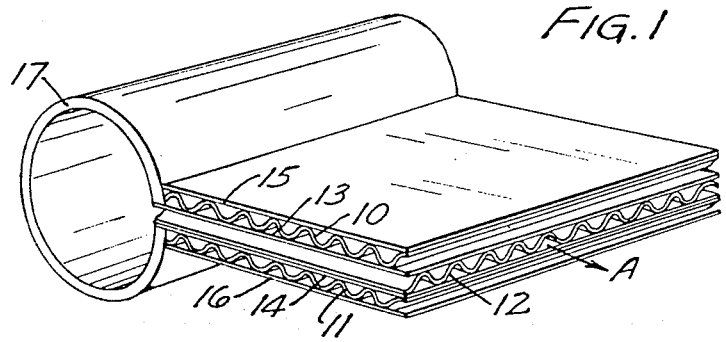
FIGURE 1 is a perspective view of a portion of a cross-current-flow heat exchanger having corrugated ceramic-type films between thin sheet members.

Referring to FIGURE 1, the portion of a cross-current heat exchanger there shown comprises a laminate of three thin corrugated films of layers 10, 11 and 12, separated from each other by two thin flat sheet members 13 and 14, and positioned between outer sheet wall members 15 and 16. The corrugated films are welded to adjacent sheet members along lines of contact between the sheet members and longitudinal ridges of the corrugations of the films. Corrugations of corrugated film 12 run perpendicularly to the corrugations of corrugated films 10 and 11.

In operation, a fluid medium of one type or temperature is passed through the channels formed between the corrugations of corrugated film 12 and sheet members 13 and 14, as indicated by arrow A, whereas a fluid medium of a different type or temperature is passed cross-wise to the flow of the first fluid medium and through the channels formed by the corrugations of corrugated film 10 and sheet members 15 and 13, as well as the channels formed by the corrugations of corrugated film 11 and sheet members 14 and 16. Heat transfer from one fluid medium to the other takes place through the extremely thin walls of the channels in the article, permitting highly efficient heat exchange. Of course, the heat exchange properties and thermal resistance of an article of this invention may be varied by using different sinterable particles from which to fabricate the article.

While only one conduit conection 17 with the heat exchanger laminae of FIGURE 1 is illustrated, such conduit 17 being for fluid media flowing through channels formed by corrugated film 12 and sheet members 13 and 14, it will readily be apparent that a similar conduit connection may be provided at the opposite end of the channels formed by corrugated film 12 and sheet members 13 and 14, so as to channel fluid media as it emerges from such centermost channels of the exchanger. Likewise, conduit connections with the channels formed by corrugated films 10 and 11 and sheet members adjacent thereto are provided for channeling the ingress and egress of fluid media through such longitudinal channels. Conduit connection 17 as well as other conduits for such a heat exchanger may be formed according to extruding methods well known in the ceramic industry, and the extruded conduit welded to the corrugated assembly according to procedures hereinafter described.

Figure 2:
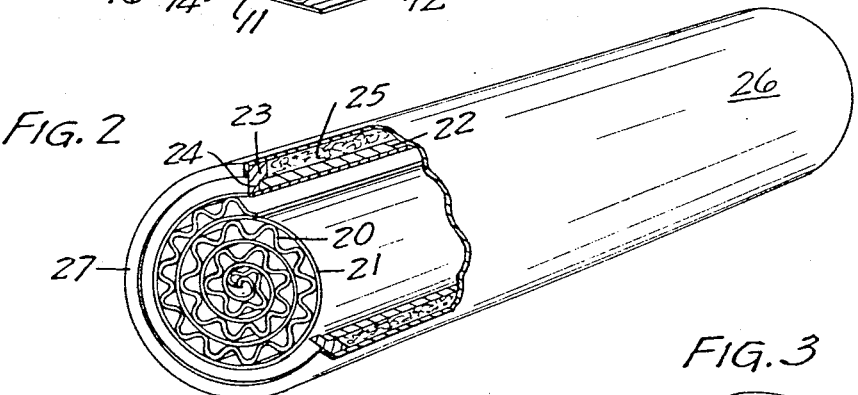
FIGURE 2 is a perspective view of a canister or cartridge article having a spirally wound corrugation formed of sinterable material.

The article illustrated in FIGURE 2 represents a further embodiment of this invention wherein a corrugated film 20 and a sheet member 21 are in the form of a helix, i.e., wound in a spiral to form a helix having an over-all configuration approximating a cylinder. The helix is preferably sinter-welded within a snug fitting ceramic cylinder 22, the latter having walls sufficiently thick to protect the helix from cracking or rupture as might otherwise develop out of excessive shock in use. A ceramic ring 23 with flange 24 is fitted (preferably removably fitted) over each end of the ceramic cylinder 22, and packing 25 such as a refractory wool shock-absorbing layer 25 wrapped around the ceramic cylinder 22 between the end ring members 23. The so-formed assembly is encased within a steel cylindrical jacket 26 with its ends beveled or flanged as at 27 over each end ring member of the assembly to retain the component parts of the article in position.

The cartridge article illustrated is particularly useful where small, light-weight, corrosion-resistant passages of high heat tolerance are desired, as in catalytic exhaust gas oxidizers, heat exchangers operating on a revolving cycle, etc. As an illustration of a heat exchanger operating on a revolving cycle, reference is made to such structures as those comprising a large cylindrical block member rotatable on a central shaft through a divider plate above and below which fluid media passes, usually in counter-current direction. The large cylindrical block has a plurality of small cylindrical passages extending therethrough parallel with the shaft of rotation and each of a size adapted to receive a cartridge member such as here described. During rotation of the large cylindrical block each cartridge member therein passes sequentially above and below the divider plate; and while on one side of the plate takes up heat from gases or fluid media passing through its channels, which heat is discharged or released to fluid media passing through the cartridge while the cartridge is in the period of its rotation taking it on the other side of the divider plate.

Figure 3:
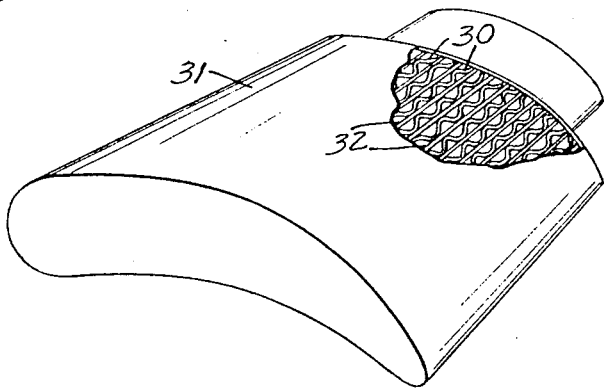
FIGURE 3 is a perspective view of a turbine blade with a portion of the outer skin cover broken away to show reinforcement by corrugated films formed of sinterable material.

An application of the critical features of this invention as reinforcing means permitting, for the first time insofar as I am aware, the formation of heat-resistant, as well as extremely light-weight, structurally-sound articles such as turbine blades is illustrated in FIGURE 3. As there shown, a plurality of ceramic corrugated films 30 serve as bracing and reinforcing elements for the skin 31 of a turbine blade. Sheet members 32 are interspersed between the ceramic corrugated reinforcing elements, preferably sinter-welded to the contacting ridges of adjacent corrugations, to impart added strength to the light-weight blade. If desired, sheet members 32 may also be corrugated and adjoining ridges of the corrugated layers sinter-welded. It will be evident that such joining of corrugated sheet members provides a honeycomb.

Figure 5:
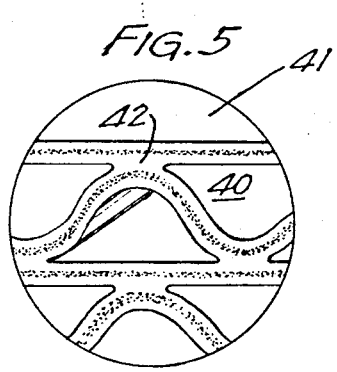
FIGURE 5 is an enlargement of the encircled portion of FIGURE 4.
Figure 4:
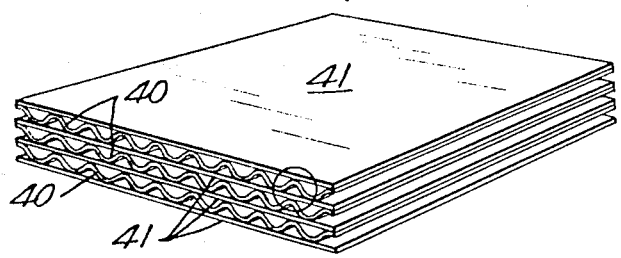
FIGURE 4 is a perspective view of a sintered laminate of corrugated films between thin flat sheets.

As a simplified illustration of corrugated structural features of this invention, FIGURES 4 and 5 may be taken as exemplary. The corrugated films 40 of the illustrated structure are separated from each other by, and sinter-welded to, thin plate members 41. The weld zone 42 is illustrated in FIGURE 5, and it will be observed that the zone is barely detectable, being essentially free of any demarcation line or juncture between corrugated films 40 and plates 41, indicating that the corrugated film and plate are well fused or coalesced together. In many structures, however, a perfect weld such as illustrated is not essential for the attainment of the advantages hereof. As used herein, the terms "weld" and "sinter-weld" mean fastened together by a thermal-rigidification step, including, but not necessarily limited to, the step of sintering contacting portions of films or sheets (or even rods) together using only materials having the composition of the films or sheets themselves. Welds, of course, may be formed by using intermediate "sinterable" or fusible ingredients not present in any films or sheets to be joined by sinter-welding, or they may be formed by thermal-rigidification involving infiltration of molten material such as metal between particles in the area of sheet members or bodies to be joined, to convert the entire area into a rigid permanent bond structure, as illustrated in Example 1 to follow. Preferably, however, the weld area between ridges of corrugations and other sheet members, whether the latter are also corrugated or not, is formed by thermal unification of temporary bonds formed using constituents or ingredients common to the sheet members to be joined (or common to the surface layer composition of sheet members to be joined), as illustrated in the examples, so that the final fired articles are of monolithic structure in that the material of joints (e.g., see FIGURE 5) cannot be separately identified from the material of the contacting surfaces of the sheet members themselves. Such structural articles have bonds equal in thermal stability to the sheet members joined.

It may also be noted here that FIGURE 5 shows a construction useful as a nuclear fuel element. The dotted portion represents a uranium compound dispersed sandwich-style in the ceramic corrugations and flat sheets.

Formation of such structures as illustrated in the drawings, as well as other related structures is readily accomplished according to the following procedure: A plasticized raw material mix containing finely divided sinterable particles, plasticizing ingredients such as, for example, organic polymeric resins, and volatile viscosity-adjusting media is formed into a thin film or sheet material by any suitable process, e.g., knife coating, spraying, calendering, extrusion, casting, etc. Such film may be formed as thin as desired, e.g., a mil or so, so long as it possesses sufficient body when free of viscosity adjusting fluids to retain its integrity after corrugation. Exceedingly thin films, however, are so delicate that they are difficult to process and handle (but may be useful as permeable membranes), whereas films thicker than about ⅛ inch tend to be too bulky for convenient corrugation as taught herein. Further, films thicker than ⅛ inch do not permit the formation of the light-weight complex articles discussed herein. Best results are obtained by avoiding extremes; and the advantages of the invention with respect to strength and structure retention without fragility or fracture problems become particularly apparent when using films about 2 to 50 mils thick formed of at least 80% by weight sinterable particles and sufficient organic polymeric plasticizing ingredients to lend a degree of flexibility to the film. Advantageously, such thin films in the structural articles hereof contribute to the thermal shock resistance of the fired structures, permitting them to withstand more rapid and severe temperature fluctuations without fracture than could be tolerated by bulky articles of the same material.

In the step of corrugation itself, it is sometimes preferable to support plasticized green ceramic films on a thin sheet of metal foil, e.g., aluminum foil, suitably of a thickness on the same order of magnitude as the film to be corrugated (but usually not greater than about 10 mils), or to sandwich the green ceramic film between two such metal foil sheets as it is passed between the corrugating rolls, suitably at room or elevated temperatures. The foil advantageously serves as a carrier to distribute corrugation stresses uniformly, aiding in obviating cracking or rupture of the green films. Also, in the case of those films plasticized with ingredients which impart an elastic memory property to the film, at least one sheet of metal foil corrugated with the film is desirably left in position after corrugations for a short time so as to maintain corrugations in the film and prevent reversion to a flat sheet. Use of a foil of material such as aluminum, however, is not required. Satisfactory results are gained in the absence of a foil; and the absence of a foil permits temporary bonding of corrugated sheets to other corrugated sheets or flat sheets simultaneously with the step of corrugating.

Corrugation of the flexible films may be accomplished using standard corrugating equipment, and without undue pressure at low temperatures. Mild heating of films or masses to be corrugated, up to elevated temperatures not sufficient to burn out all organic plasticizers in the green films, has been found useful to impart a degree of permanency to the corrugations in green films. Usually corrugations of uniform periodicity are formed, e.g., corrugations of repetitive and uniform wave shape, amplitude, and pitch as illustrated in the drawings; but in some applications, as for example where a corrugated sheet is spiralled upon itself to form a roll or helix, it may be preferable to employ a corrugated sheet having a graduated decrease in pitch, or possibly a graduated increase in amplitude with the pitch remaining the same, or both. The corrugations most frequently employed are those of standard curved ridges and grooves; however, other wave shapes of irregular periodic configuration may be useful, e.g., those representing the sum of all even or odd harmonics, as well as various combinations of harmonics. In all instances, however, the corrugations are of the repetitive type with both sides of the corrugated sheet exhibiting a repetitive pattern. While small variation from this requirement may not upset end results, and the thicknesses of corrugated sheets may vary at locations along corrugated wave patterns, all corrugated sheets hereof are of the type having a repetitive corrugated pattern on both sides of the sheet; and the term "corrugation" is to be understood as having this meaning. The amplitude of corrugations (i.e., the elevation distance between the peak of a ridge and the lowermost portion of an adjacent groove) is at least as great as the thickness of the film that is corrugated, which means that the elevation distance between the peak of a ridge on one side of a corrugated film and the peak of a ridge on the opposite side of the film is at least twice as great as the thickness of the film itself. Preferably the amplitude is at least twice as great as the thickness of the film; and the majority of structural articles of this invention generally have corrugations with amplitudes at least five times greater than the thickness of the film.

Following corrugation, while the sinterable flexible plasticized corrugated films are in the green unfired state, they are sawed, cut and fabricated into assemblies and structures such as illustrated in the drawings. Where the ridges of corrugations on one side of a corrugated film are to be welded to a sinterable sheet member or panel, the basic raw material mix from which the sinterable film or sheet material was formed may, diluted with organic solvents or fluids to adust viscosity, be painted over the ridges of the corrugations as a glue media for affixing a sinterable sheet member thereto. The solvent of the applied glue media between the ridges of corrugations and the sheet member may tend to solvate a portion of the adacent film and sheet member before volatilizing into the air. In any event, once the structure is dried, a temporary bond between the ridges and the sheet member is formed, which, after the structure is fired to sintering temperatures, turns into a strong and rigid weld. Alternatively, if desired, heat-sealing of panel sheet members to the ridges of contacting corrugations may be accomplished to form a temporary bond in fabrication.

In the green unfired state, the corrugated structures and assemblies can easily be cut or sawed to shape, e.g., sawed into over-all shapes as needed for internal reinforcement of a turbine blade, and bonded to skin panels, conduits, etc., as desired, using glue media or heat-sealing as aforedescribed.

Where solvent is employed in the bonding operation, the completed structural article is allowed to dry so as to substantially remove volatile solvents or organic fluids from its joints. Then the structures are heat unified by using temperatures suitable for sintering of the particular sinterable ingredients in the corrugated films and other portions of the structure, as well understood in the ceramic art; or they are heat-unified by using firing temperatures suitable for infiltration of molten material between the refractory sinterable particles in the corrugated films to thereby achieve rigidification of the structure. Heat unification may also be accompanied by a reaction in situ during firing. Illustrative firing conditions for various compositions are set forth in the examples hereof. It should be noted that rapid firing cycles may be employed without damaging the structural articles; in fact, "shock" firing, i.e., firing by placing the article in a furnace held at the temperature required for sintering, followed by removing it directly to room temperature, is frequently suitable to employ, particularly with small structures.

My invention will be further described and illustrated in connection with the following examples:

Example 1

A plastic mixture is prepared consisting of 39.4 parts of polyvinyl butyral (which may be obtained under the trade name "Butvar" from the Shawinigan Resin Corporation), 15.8 parts of a polyalkylene glycol plasticizer, 3.5 parts of "Tergitol" (a wetting agent sold by Carbide and Carbon Chemicals Company which contains lower alkyl ethers of polyethylene glycol), 33 parts of micronized graphite (particle size 2 to 10 microns available from the Dixon Crucible Company), 67 parts of 325 mesh coke, 33 parts of 600 mesh silicon carbide and 200 parts of 1000 mesh silicon carbide. A sufficient amount of toluene is added to make the mixture substantially liquid. Mixing is continued until the mixture is substantially homogeneous, and then a thin film is prepared by knife-coating the plastic mixture on a sheet of polymer such as polyethylenue terephthalate to a thickness of about 10 mils. The film thus prepared is warmed slightly to evaporate the toluene therefrom. A plasticized sinterable film is obtained containing carbon, silicon carbide and the resin mixture described. It does not adhere to the polymer sheet and can easily be stripped off, yielding the film in a substantially workable condition to permit the fabrication of structures as herein described.

The film is stripped off the polymer sheet and sandwiched between two aluminum foils of approximately the same thickness as the film. The sandwich is passed through a corrugating apparatus containing corrugating rolls of a size giving about 7 corrugations of about 100 mils amplitude per inch. Corrugations of the repeating periodic wave type illustrated in the drawings were used. While in the green state, prior to firing, the corrugated sheet may be shaped, e.g., formed into a tube, spiralled, etc., as may be desired.

Firing of the corrugated film is suitably accomplished by placing it with a quantity of silicon in a graphite resistance furnace previously raised to a temperature of about 3500° F. to 4000° F. and containing a helium atmosphere, or other inert atmosphere. The quantity of silicon should weigh about four times the weight of the corrugated film to be fired. After a few seconds of heating, the fugitive or temporary organic materials disappear leaving a fragile corrugated shape composed of the initial carbon and silicon carbide in the basic mixture. The silicon melts and infiltrates the carbon-silicon carbide structure, reacting with the elemental carbon to form some additional silicon carbide in situ. After about one minute, the corrugated film, heat-unified by molten metal infiltration between the refractory particles of the body as described, is removed from the furnace and allowed to cool to room temperature. No control over the rate of cooling need be exercised. (Heat unification of a body of silicon carbide particles by sintering would require higher temperatures than illustrated in this example, or special low-temperature bonding additives such as clay.)

The resulting corrugated sheet is useful, for example, as a spacer in high temperature nuclear reactor fuel elements. It can withstand long periods of exposure to temperatures as high as 1300° C. or higher without noticeable deterioration.

More complex corrugated structures and shapes such as illustrated in the drawings may also be formed using the basic material mix of this example. Heat exchangers of various configuration characterized by a laminate as illustrated in FIGURE 1, or a helix as illustrated in FIGURE 2, are readily fabricated using flat plasticized sheet members and corrugated plasticized films of carbon and silicon carbide. Welds between flat panels and ridges of corrugations, as well as other elements to be joined, are accomplished by interposing a thin coating of solvent diluted basic raw material mix between the ridges of corrugations and the panel (or other parts to be joined), allowing a short period of time for solvent spreading, penetration and evaporation, and then firing as aforedelineated.

Example 2

A basic plastic raw material mix is prepared consisting of 85 parts of alumina particles having an average diameter of about 10 microns (with particles varying from about 1 to 44 microns), 15 parts of a tetrapolymer, and about 40 parts of a solvent mixture consisting of 22.1% ethyl acetate, 38.95% Cellosolve acetate, and 38.95% nitroethane. The tetrapolymer consists of about 30% by weight octadecyl acrylate, 30% acrylonitrile, 35% cyclohexyl acrylate, and 5% acrylic acid copolymerized in ethyl acetate. It is in the form of an organosol and sufficient Cellosolve acetate (also called ethoxyethyl acetate) and nitroethane are added to give the solvent mixture aforespecified.

The raw material mix is placed in a porcelain ball mill and milled for about 8 hours to form a uniform blend of the ingredients. Satisfactory blends have been formed, however, by merely stirring the ingredients together without ball milling. The milled slurry is knife-coated as a thin layer on a low adhesion carrier web of polyethylene coated paper to a thickness sufficient to provide a solvent-free coating about 5 mils thick, and the coating is then air dried at room temperature so as to be substantially free of solvent vehicle.

The dried coated layer is stripped from the low adhesion carrier web of polyethylene coated paper, placed on an aluminum foil of about 5 mils thickness, and passed through a corrugating apparatus, the rolls of which are at about 270° F. and provide 15 curved periodic corrugations of 30 mils amplitude (i.e., elevation from bottom of valley to top of ridge of each corrugation) per inch. Corrugations of this film under heat is preferred, as the thermoplastic binder employed, while imparting a degree of room-temperature flexibility to a thin sheet as here described, is relatively stiff as compared to the formulation of Example 1. The room temperature relative rigidity is desirable for handling the material in fabricating green shapes.

After corrugating, the exposed ridges of the corrugated strip are fastened to a 5 mil thick flat strip of plasticized ceramic-particulate of the type above specified in this example by "heat-sealing," i.e., heating the flat strip by passing it over a heated roll at 270° F. and bringing the flat strip into contact, using slight pressure, with exposed ridges of the corrugated film while it is still hot from the corrugating step. The carrier strip of aluminum is then removed from the corrugated film.

The foregoing structure may be fired by heating it to 1650° C. over a period of four hours and then cooling it to room temperature over a period of 4 hours, without holding the article any extended time at the maximum temperature. Much shorter firing cycles may be employed; in fact, the article can be fired in about 15 minutes by placing it in a pre-heated furnace at 1650° C. Cooling can be accomplished essentially as rapidly as desired.

If desired, the foregoing structure while in the green state (particularly where the width of the flat strip and the corrugated film are the same) may be wound, suitably while it is at room temperature or slightly warmed, in a spiral to form a helix such as illustrated in FIGURE 2, using a coating of the slurry of this example to tack a few of the ridges of corrugations to the flat strip as winding is accomplished. Tacking, however, is not absolutely necessary. In forming the article of FIGURE 2, such a helix, while in the green state, is inserted into a snug fitting cylinder of extruded or pressed green alumina. Firing is then accomplished using the aforementioned firing temperature at 1650° C., but with a soak period preferably about one-half hour at the maximum temperature, followed by cooling to room temperature over about a 1 to 4 hour period. Should a catalytic oxidizer element for exhaust gases be desired, the structure, after firing, may be dipped briefly in a water solution of dilute (about 1%) palladium chloride (or platinum chloride, chromic acid, etc.) and dried free of water at room temperature, followed by a brief firing up to 800° C. suitably in an air, without any extended soak period at 800° C., using about a 4 hour cycle for the firing.

Example 3

The basic raw material mix of Example 2 is coated out and dried to form a solvent-free plasticized film of about 20 mils thick. Using the conditions set forth in Example 2, the film is corrugated to provide about 10 uniform-wave corrugations of about 100 mils amplitude per inch. The corrugated film is cut into rectangular sections and the corrugated sections placed between separating 20-mil thick plasticized sheet members formed of the same basic raw material as the corrugated sections. Simultaneously the outer ridges on each side of the corrugated sections are heat-bonded to the separating sheet members using conditions as described in Example 2. The resulting structure is that illustrated in FIGURE 4, but with a greater number of corrugated and flat sheet members in the stack. Using a jeweler's handsaw, the structure is cut so as to form the curved over-all configuration of a turbine blade (see FIGURE 3). About this structure, which constitutes the internal reinforcement for the turbine blade, is then wrapped flexible plasticized pre-cut green flat skin panels about 20 mils thick and suitably formed of the same basic raw material as the corrugated sections. The flat skin panels are glue-bonded to the edges of the internal corrugated reinforcing sections using conditions as set forth in Example 2. Thereafter, the structure is fired by heating it to about 1650° C. over a 12 hour firing cycle with the maximum soak temperature being maintained for about one-half hour. After firing, the turbine blade can withstand considerably more thermal shock without cracking or rupture than solid blades of the same material, and can be used in extraordinary intense heat environments (e.g., "red-heat") without corrosion or noticeable deterioration.

Example 4

A basic plastic raw material mix is prepared consisting of 80 parts by weight of beryllia having a particle size averaging about 1 micron, 20 parts of tetrapolymer of Example 2, and about 50 parts by weight of the solvent mixture of Example 2. About 1 part by weight of concentrated nitric acid solution is added as a deflocculating agent to the basic new material mix. The nitric acid serves to neutralize any residual alkaline beryllium compounds in the beryllia, and prevents coagulation in the tetrapolymer slurry. It has been found that alkaline ceramic particles should be neutralized to prevent coagulation in a slurry formed using this tetrapolymer.

The slurry is then ball milled for about 8 hours so as to gain a uniform blend. The blended slurry is coated at a thickness of about 10 mils on a low adhesion surface, i.e., polyethylene coated paper, and the coating allowed to partially dry (e.g., to dry until only about 20% of the solvent remains in the film). A second 10-mil thick layer consisting of the same raw material slurry as used for the first layer, but in addition containing approximately 5 parts of enriched uranium oxide fuel (the uranium being essentially U-235), is then knife-coated over the partially dried first layer and also allowed to partially dry (i.e., to about 20% solvent retention). Finally, a third layer is knife-coated over the second layer, the third layer also being 10 mils thick and consisting solely of the same basic raw material mix as used for the first layer. The entire laminate is dried in air at room temperature, the final dried thickness being on the order of about 15 to 20 mils.

The dried laminate is lifted from the polyethylene coated paper and about half of the laminated strip placed upon a 10-mil aluminum foil. The aluminum foil and the laminate are passed together through a corrugating apparatus, the rolls of which are about 270° F. and provide about 8 corrugations of 50 mils amplitude per inch.

The portion of the laminate of this example not corrugated is painted or sprayed on one side with a thin coating of a slurry consisting of the basic raw material mix of this example, and then placed with its coated side against the exposed ridges of the corrugations of the corrugated film. The solvent from the coated slurry penetrates slightly into the surface portions of the ridges of the contacting corrugations and then evaporates at room temperature. Squares are cut from the resulting assembly sheet consisting of corrugated film and flat sheet material, and the squares stacked to form the article illustrated in FIGURE 4, with the exposed portions of the flat sheet material of each assembly sheet being painted or sprayed with a thin coating of the basic raw material mix of this example so as to glue the composite structure together at points of contact between the ridges of corrugations and the flat sheet members. Exposed edges of the sandwich sheet members are also coated with the basic raw material mix to seal in the fuel. The composite article resulting is then allowed to dry at room temperature and fired in an inert atmosphere (e.g., a hydrogen atmosphere) using a 16½ hour firing cycle and a maximum soak temperature of about 1550° C. maintained for ½ hour in the middle of the firing cycle. The resulting composite sintered ceramic structure is useful as a fuel element in atomic reactors.

It will be understood that a wide variety of sinterable materials may be fabricated into corrugated shapes as taught herein, and that the foregoing examples are illustrative of but a few specific materials which may be employed. Further illustrations of refractory materials which may be used are zirconia, cordierite, fosterite, zircon, barium titanate, porcelain, thoria, urania, steatite, magnesia, samaria, gadolinia, various carbides including boron carbide, spinels, etc. Metal powders may be shaped into corrugated intricate structures and fired in oxidizing atmospheres to create the refractory ceramic articles of the invention, or carbide articles may be formed by fabricating preforms of corrugated articles using reactive ingredients which on firing produce a final refractory article as illustrated. Articles as herein taught may be formed from sinterable ceramic and metal mixtures, e.g., chromium and alumina mixtures, to form cermets. Sinterable ceramic particles or fibers of a refractory nature, together with materials serving as fillers or reinforcing media, may be employed to form the heat-rigidified articles hereof. Metal rods, wire screens, etc. may be used for reinforcement of ceramic sheets corrugated as taught herein. Indeed, fillers or reinforcing materials in the form of rods or various shapes formed of sinterable metal particles held together by binder or plasticizing ingredient as herein discussed, may be dispersed throughout a mixture of plasticized ceramic particles (the metal particles and ceramic particles being preferably so selected for approximately matching coefficients of thermal expansion) and the composite formed into an article of complex configuration with corrugated members as described, to give upon firing (preferably in an inert atmosphere such as argon or hydrogen) an end article of improved tensile strength and resistance to cracking on thermal shock. A particular advantage gained using this type of reinforcing filler media as distinguished from using pre-formed fully densified solid non-sinterable wires of metal (e.g., conventional metal wires, screens, etc.) is that of avoiding structural defects such as holes, cracks, protruding ends of wire and the like in a final corrugated end article of the invention, which result from the ceramic shrinking on sintering while the already dense metal filler does not.

As illustrated in Example 4, sandwich laminates of various sinterable particles may be corrugated to form the articles hereof; and the laminate may if desired be formed of alternate layers of ceramic and metal sinterable particles, with the plasticizing binder for various of the layers being the same or different. For example, a laminate of a layer of zirconium oxide powder, a layer of molybdenum powder, and a layer of zirconium oxide powder, each layer being plasticized and bonded to the others by the binder of Example 2, may be corrugated and then formed into a honeycomb structure or other structural configuration illustrated in the drawing using a slip of zirconium oxide-binder for temporary gluing or bonding between meeting ridges of corrugations of different corrugated layers (in the case of a honeycomb) or between meeting lines of junction between flat plates and corrugated sheets (as illustrated in the drawings), to form, upon firing in an inert atmosphere such as argon or hydrogen, a complex sintered shape of electrically conductive materials protected on its multitudinous surfaces by a heat and corrosion resistant refractory ceramic.

The corrugated complex thin-walled structural configurations hereof may also be formed with additions of mica (which may indeed serve as a binder material). Non-refractory materials such as, for example, alkali compounds and the like may be incorporated in small amounts (e.g., a few percent) as fluxes in the sinterable films of this invention, if desired. For example, certain complex mixtures of lithium aluminum silicates are useful to form bodies of low or zero coefficient of thermal expansion. Refractory fluxes such as alkaline earth compounds (e.g., oxides, fluorides, nitrates, etc.) may also be useful.

While the greatest benefits of the invention appear to arise in cases where sinterable refractory ceramic materials are employed, it is also true that the principles of this invention may be used to advantage to form corrugated articles out of non-ductile, non-malleable, but sinterable metals such as, for example, brittle powdered tungsten, beryllium, molybdenum, tantalum, intermetallic compounds, such as, for example, zirconium diboride. Thermal or other treatments may be employed to alter end-properties of articles formed of metals, as for example, to introduce some flexibility or ductility. Unified complex structures having corrugated members of ceramic and metal members interspersed are possible. The process herein taught for forming corrugated heat-resistant articles as well as sinter-welding is also useful to form sinter-welded intricate corrugated structures out of more conventional metals (e.g., iron, stainless steel, etc.), and would introduce important economies and advantages in the production of such corrugated structures. Particularly significant in this respect is the ability to form intricate corrugated metal structures of uniform composition and crystal structure (as observable in X-ray diffraction analysis) throughout the intricate structures, including all bonded areas and sheet portions, which has been impossible using metal brazing techniques to join metals together as done in the past. If desired, these thermally rigidified metal structures may be subjected to various temperature or other treatments to alter end-properties of the article, as for example, mild oxidation to improve or increase rigidity.

A variety of organic plasticizing ingredients, e.g., polyvinyl chloride, phenol formaldehyde resins, nitrile rubbers, etc., and combinations thereof may be employed in the formation of the green sinterable films and sheet members used to fabricate corrugated articles according to this invention. Several illustrative well-known organic plasticizing ingredients suitable for use are set forth in my patent application filed May 7, 1957, Ser. No. 657,503; and the disclosure thereof is here incorporated by reference. Also, water soluble plasticizing agents or binders, e.g., methyl cellulose, may be used to form flexible films highly filled with sinterable particles; and the volatile temporary liquid vehicle for slip or paste formation may be water. In general, the plasticizing agent selected for any particular sinterable particulate material will be so selected as to be non-reactive with the sinterable particles of the mass during subsequent firing. However, while burn-out binders non-reactive with the sinterable material are preferred, it is sometimes satisfactory to employ binders which react with the sinterable particles to form refractory masses in situ. Even inorganic plasticizing ingredients or low temperature curing agents or binders, e.g., soluble alkali silicates, bentonites, aluminum hydrogen phosphates, as well as a variety of others, may be employed where the presence of residual material of the plasticizer or binder is not detrimental to other properties required in final corrugated end products.

It will be understood that may variants of the structural configurations specifically illustrated in the drawings hereof (e.g., employment of a center conduit member in the article of FIGURE 2, arcing of laminated corrugated structures, etc.) are possible without departing from the essential corrugated structural feature of the new articles of this invention, as further set forth in the claims appended hereto.

Many uses for the articles hereof in addition to those heretofore recited will readily suggest themselves to those becoming familiar with this invention. Some illustrative additional uses are the following: nuclear reactor components, filters, insulators (acoustical, electrical, and thermal), noise suppressors or mufflers, components of aircraft and missiles, radomes, circuit bases, wave guides, combustion ports, rocket nozzles and vanes, a base support structure for ablation materials, heat exchangers for automobile afterburners (e.g., particularly cross-current heat exchangers such as illustrated in FIGURE 1, or counter-current heat exchangers), etc.

That which is claimed is:

1. A fired ceramic structural article having a high surface area in relation to its size, and comprising at least one ceramic sheet member and at least one thin corrugated web of ceramic having an amplitude of corrugations at least as great as the thickness of said web, said corrugated web being no greater than 50 mils thick and being permanently ceramically bonded to said sheet member in a non-separable manner along at least a portion of some of the ridges on one side of said corrugated web so as to provide at least one set of aligned passages defined by grooves of said corrugated web between adjacent ridges permanently bonded to said sheet member, said article being formed by a process involving ceramically firing to rigidity a self-supporting green ceramic structure of like configuration having firm temporary bonds of green ceramic corresponding in location to said permanent ceramic bonds in said structural article, said green ceramic structure comprising materials convertible into said fired ceramic structural article by said ceramic firing, and said firm temporary bonds of said green ceramic structure being unified continuous material paths of green ceramic material between parts of said green structure so temporarily bonded.

2. As an article of manufacture, a refractory non-ductile, non-malleable, brittle structure having multiple surfaces and a high surface area in relation to its size, consisting essentially of at least two refractory non-ductile non-malleable brittle sheets less than 50 mils thick, at least one of which has corrugations which have an amplitude at least as great as the thickness of said one sheet, said sheets being permanently inseparably united together by means of refractory non-ductile non-malleable brittle material at a plurality of lines of contact there-between so as to define multiple aligned passages in said structure, said structure being self-supporting and non-flowing even at temperatures as high as 1000° C., and being formed by a process involving thermal rigidification of a green structure of like configuration having firm temporary bonds corresponding in location to the portions of said sheets permanently inseparably united in said refractory structure, said green structure comprising refractory sinterable particulate and being convertible into the material of said refractory structure by thermal rigidification, and said firm temporary bonds of said green structure being unified continuous material paths of refractory sinterable particulate material between parts of said green structure so temporarily bonded.

3. A heat-resistant multi-passaged thermally-rigidified brittle cartridge having a corrugated sheet member no greater than 50 mils thick permanently united along ridges of several of its corrugations to a non-corrugated sheet member and having the two sheet members shaped in the form of a helix, said cartridge being formed by winding the corrugated sheet and non-corrugated sheet in said helical form and firmly temporarily bonding said corrugated sheet along ridges of several of its corrugations to said non-corrugated sheet while each said sheet comprises sinterable inorganic particles in a flexible plasticized green state prior to thermal rigidification of the same, said firm temporary bonds being green unified continuous material paths of sinterable inorganic particles between parts of the green structure temporarily bonded, the strength of said temporary bonds being sufficient to maintain said flexible plasticized green sheets together and prevent relative displacement thereof during handling of the structure prior to thermal rigidification of the same, and the composition of said firm temporary bonds and said sheets in the flexible plasticized green state being converted into the composition of said thermally rigidified brittle cartridge by said thermal rigidification.

4. A rigid sintered inorganic multiple-webbed honeycomb article having multiple surfaces and a high surface area in relation to its size, formed of a plurality of corrugated sheets less than about 50 mils thick in stacked relationship to one another with the ridged portions of adjacent corrugated sheets in aligned abutting relationship and permanently inseparably united together to form multiple passages in the article, each passage being defined by paired grooves of corrugations between permanently inseparably united abutting ridges of corrugations, said article being formed by sintering a green article of like configuration formed of green corrugated sheets firmly temporarily bonded in the green state along aligned abutting ridges of corrugations, said green article being composed of sinterable inorganic particles convertible into said rigid inorganic honeycomb article by sintering, and said firm temporary bonds being green unified continuous material paths of sinterable inorganic particles between parts of said green structure temporarily bonded, the strength of said temporary bonds sufficient to maintain said green corrugated sheets together and prevent relative displacement thereof during handling of said green article preliminary to sintering the same.

5. A rigid inorganic multiple-webbed thermally rigidified article of predetermined size and shape having multiple surfaces and a high surface area in relation to its size, formed from at least two sheets, at least one of which is no greater than 50 mils thick and corrugated with an amplitude of corrugations at least as great as the thickness of the sheet, and at least one of which comprises a laminate having ceramic on the outer exposed surface portions thereof, said sheets being permanently inseparably bonded together at a plurality of lines of contact therebetween so as to define a series of aligned passages in said article, said article being self-supporting and formed by thermal rigidification of sinterable inorganic particles in a green structure of like configuration having firm temporary bonds corresponding in location to said permanent bonds in said article, said firm temporary bonds of said green structure being green unified continuous material paths of sinterable inorganic particles between parts of said green structure temporarily bonded, the strength of said temporary bonds being sufficient to maintain the firmly temporarily bonded parts of said green structure together and prevent relative displacement thereof during handling of said green structure preliminary to thermal rigidification of the same.

6. A rigid inorganic multiple-webbed thermally-rigidified structure formed from at least two sheets, at least one of which is no greater than 50 mils thick and corrugated with an amplitude of corrugations at least as great as the thickness of the sheet, and at least one of which consists essentially of ceramic with metal present therewith, said sheets being permanently unified at a plurality of lines of contact therebetween so as to define multiple passages in said structure, said structure being self-supporting and formed by a process involving thermal rigidification of a green preform of like configuration having firm temporary bonds corresponding in location to said locations of permanent unification in said structure, said green preform comprising sinterable inorganic particles convertible into the composition of said rigid inorganic structure by thermal rigidification, and said firm temporary bonds of said green preform being green unified continuous material paths of sinterable inorganic particles between parts of said green preform temporarily bonded, the strength of said temporary bonds being sufficient to maintain the firmly temporarily bonded parts of said green preform together and prevent relative displacement thereof during handling of said green preform preliminary to thermal rigidification of the same.

7. A process for forming an intricately-shaped brittle inorganic thermally-unified article from plasticized shapes of sinterable particles in such manner as to form permanent welds of juncture between abutting parts of said article, with the permanent welds being of composition and crystal structure the same as the composition and crystal structure of the surface layers of the abutting parts, said process comprising coating upon the portion of liquid-free green organically plasticized shapes of sinterable particles to be joined a fluid slip having substantially the same inorganic solids analysis as the surface layer composition of the green shapes to be joined, the solid ingredients of said slip being rendered fluid by the presence in said slip of volatile normally-liquid material capable of penetrating surface portions of said organically plasticized green shapes to be joined, said coating being such as to cause said volatile normally-liquid material in said slip to penetrate said surface portions of said organically-plasticized green shapes so coated, fabricating a preform of the desired end article by placing slip coated portions of said shapes in abutting relation to portions of the green plasticized shapes where a bond of juncture is desired, drying the volatile normally-liquid material from the slip coated areas of the preform, and then thermally rigidifying the green preform.

8. A process for forming an intricately-shaped brittle inorganic thermally-unified article from plasticized shapes of sinterable particles in such manner as to form permanent welds of juncture between abutting parts of said article, with the permanent weld being of composition and crystal structure the same as the composition and crystal structure of the surface layers of the abutting parts, said process comprising forming green plasticized shapes consisting of sinterable particles temporarily unified with an organic binder material exhibiting a thermoplastic stage on heating, fabricating a preform of the desired end article by heat-sealing portions of said green plasticized shapes to those portions of the green plasticized shapes where a permanent bond of juncture is desired in the end article, said heat sealing being such as to form a temporary bond of unified green plasticized material between those portions of said green plasticized shapes where a permanent bond of juncture is desired in the end article, volatilizing the organic binder material from the green preform, and then thermally rigidifying the preform article.

9. A heat-resistant brittle multiple-webbed helical article comprising a thermally rigidified corrugated sheet member wound in overlapping convolutions and permanently inseparably united along ridges of corrugations to portions of said helical article contacting said ridges, said sheet member being no greater than 50 mils thick and being corrugated with alternating ridges and grooves on each side thereof, the amplitude of corrugations being at least as great as the thickness of said sheet member, and said article being made by thermally rigidifying a green article formed by a process including corrugating a green flexible sheet member of sinterable particles, winding said corrugated sheet so as to form overlapping convolutions of the same, and firmly temporarily bonding ridges of corrugations to portions of the green article contacted by said ridges to maintain said firmly temporarily bonded parts together and prevent relative displacement thereof during handling of said green article prior to thermal rigidification of the same, the firm temporary bonds of said green article being green unified continuous material paths of sinterable particles between parts of said green article temporarily bonded.

10. A sintered metallic structural article having a multiple-webbed configuration with at least a portion of the webs thereof being corrugated and permanently sinter-welded to other webs of the article along ridges of said corrugations, said sinter-welds being of substantially the same composition and crystalline structure as the surface layer of a web so sinter-welded, said structural article being formed by sintering a green structure of like configuration formed of a plurality of relatively flexible green webs of sinterable metal particles, at least a portion of said webs being no greater than ⅛ inch thick and corrugated with alternating ridges and grooves of essentially uniform periodicity on each side thereof, with the amplitude of corrugations for each such web at least as great as the thickness of the respective web so corrugated, at least a portion of said corrugated webs being firmly temporarily bonded along ridges of corrugations to other green webs of said green structure by green unified continuous material paths of sinterable metal particles between said ridges of corrugations and other green webs of said green structure, the strength of said green unified continuous material paths being sufficient to maintain said firmly temporarily bonded parts together and prevent relative displacement thereof during handling of said green structure, said structure being characterized by having a plurality of channels, the metal solids particulate of said temporary bonds being substantially the same in composition as the metal solids particulate on the surface layer of a green web so temporarily bonded, and said temporary bonds being converted to said permanent sinter-welds during sintering said green structure.

11. A method for making a multiple-webbed ceramic article wherein the channels are of pre-determined shape and size which comprises forming a green ceramic sheet out of materials comprising pulverized ceramic and an organic binder therefor, corrugating the sheet, forming the corrugated sheet into a green preform structure with at least a portion of the ridges of corrugations in said corrugated sheet abutting and firmly temporarily bonded to green ceramic of said preform structure in such manner as to form channels, said temporary bonds being accomplished in the formation of said preform structure by volatilizing a volatile liquid vehicle included at least in the parts of said preform structure to be so temporarily bonded, and firing the green preform structure to sinter the particles into a unitary ceramic article, whereby the channels in said green preform structure are maintained in said unitary ceramic article.

12. A ceramic article comprising a sleeve of ceramic and a multiple-webbed ceramic structure therewithin and permanently sinter-bonded thereto, said multiple-webbed ceramic structure having a sheet member no greater than 50 mils thick corrugated with an amplitude of corrugations at least as great as the thickness of said sheet member, with ridges of said corrugations permanently sinter-bonded to another sheet member, said ceramic article being formed by sintering a green ceramic structural preform of like configuration having firm temporary bonds of unified green ceramic corresponding in location to said permanent sinter-bonds in said ceramic article.

13. A rigid inorganic multiple-webbed sintered article of predetermined size and shape having multiple surfaces and a high surface area in relation to its size, formed from at least two sheets, at least one of which is no greater than 50 mils thick and corrugated with an amplitude of corrugations at least as great as the thickness of the sheet, and at least one of which comprises a laminate having one type of ceramic on the outer exposed surface portions thereof and a material of different ceramic composition embedded in a layer between said exposed surface portions, said sheets being permanently and inseparably sinter-bonded together at a plurality of lines of contact therebetween so as to define multiple passages in said article, said article being self-supporting and formed by sintering a green ceramic structure of like configuration having firm temporary bonds of unified green ceramic corresponding in location to said permanent sinter-bonds in said article, said firm temporary bonds being at least effective to prevent displacement of said green ceramic sheets with respect to each other during handling of said green ceramic structure.

14. A process of making a rigid structural element having multiple corrugated components, comprising (1) forming a flexible green sheet no greater than ⅛ inch thick and consisting essentially of sinterable inorganic particles held together by a flexible binder material, (2) corrugating said sheet with a uniform and repetitive amplitude of corrugations at least as great as the thickness of said sheet, (3) temporarily bonding the ridges of corrugations of said sheet to another flexible green sheet no greater than ⅛ inch thick and consisting essentially of sinterable inorganic particles held together by a flexible binder material, thereby to form an intermediate assembly consisting of a corrugated green sheet temporarily bonded along ridges of corrugations to another green sheet, (4) stacking a plurality of intermediate assemblies while simultaneously temporarily bonding the exposed ridges of corrugations of said intermediate assemblies to contacting portions of adjacent assemblies in the stack, thereby to form a multiple passaged green structural element having a high exposed surface area in relation to its size, said temporary bonds being green unified continuous material paths of sinterable inorganic particles, the strength of said temporary bonds being sufficient to maintain the temporarily bonded parts together during handling prior to firing, and (5) firing said green structural element to a rigid state, whereby the temporary bonds of said green structural element are converted to permanent inseparable rigid welded joints in said rigid structural element.

15. A refractory structure having a high surface area in realtion to its size, comprising at least two thin self-supporting refractory rigid sheets, at least one of which is no greater than 50 mils thick and corrugated with corrugations of an amplitude at least as great as the thickness of said sheet, said corrugated sheet being permanently refractorily bonded in an inseparable manner to the second sheet along at least a portion of some of its ridges of corrugations such that a series of aligned passages are formed in said structure, and said structure being formed by thermally uniting non-metallic inorganic particles in a green structural preform of like configuration by unfiltration with molten metal, said green structural preform being characterized by having firm temporary bonds of green unified continuous material paths of non-metallic inorganic particles between ridges of corrugations of the corrugated sheet and the second sheet.

16. A process for forming an intricately-shaped sintered metal article from plasticized green shapes of sinterable metal particles, the process being such as to form permanent sinter-welds of juncture between parts of said article, said process comprising coating upon the portion of liquid-free green organically-plasticized shapes of sinterable metal particles to be joined a fluid slip containing volatile normally-liquid material capable of penetrating surface portions of said organically-plasticized green shapes to be joined, said coating being such as to cause said volatile normally-liquid material to penetrate surface portions of said organically-plasticized green shapes so coated, fabricating a preform of the desired end article by placing coated portions of said shapes in abutting relation to portions of the green plasticized shapes where a bond of juncture is desired, drying the volatile normally-liquid material from the coated areas of the preform, and then sintering the green metal preform.

17. A process for forming an intricately-shaped sintered metal article from plasticized green shapes of sinterable metal particles, the process being such as to form permanent sinter-welds of juncture between parts of said article, said permanent sinter-welds being of a composition and crystal structure the same as the composition and crystal structure of the surface layers of parts of said article so joined, said process comprising coating upon the portion of liquid-free green organically-plasticized shapes of sinterable metal particles to be joined a fluid slip having substantially the same metal solids analysis as the surface layer composition of the green shapes to be joined, the solid metal ingredients of said slip being rendered fluid by the presence in said slip of volatile normally-liquid material capable of penetrating surface portions of said organically-plasticized green shapes to be joined, said coating being such as to cause said volatile normally-liquid material in said slip to penerate surface portions of said organically-plasticized green shapes so coated, fabricating a preform of the desired end article by placing slip coated portions of said shapes in abutting relation to portions of the green plasticized shapes where a bond of juncture is desired, drying the volatile normally-liquid material from the slip coated areas of the preform, and then sintering the green metal preform.

18. A rigid inorganic multiple-webbed sintered structure comprising a plurality of sintered inorganic sheets arranged in superimposed relationship, at least the alternate sheets of said structure being no greater than ⅛ inch thick and being corrugated with ridges and grooves of essentially uniform periodicity on each side thereof, with the amplitude of corrugations in each said respective corrugated sheet being at least as great as the thickness of said respective corrugated sheet, said corrugated sheets being permanently and inseparably bonded along the contact between ridges of the corrugations thereof to adjacent sheets in said structure by means of sintered inorganic material, the composition of said sintered inorganic material in said bonds being essentially the same as the composition of the surface layer of said sintered inorganic corrugated sheets adjacent said bonds, said rigid inorganic structure being self-supporting and formed by a process involving sintering a green preform of like configuration having firm temporary bonds corresponding in location to the inseparable bonds in said rigid inorganic structure, said green preform comprising sinterable inorganic particles convertible into the composition of said rigid inorganic structure by sintering, said firm temporary bonds of said green preform being green unified continuous material paths of sinterable inorganic particles between said parts so temporarily bonded, the strength of said temporary bonds being sufficient to maintain the firmly temporarily bonded parts of said green preform together and prevent relative displacement thereof during handling of said green preform preliminary to sintering the same.

19. The structure of claim 18 characterized by having essentially the same composition in all portions thereof.

20. The structure of claim 18 consisting essentially of metal.

21. The structure of claim 18 consisting essentially of ceramic.

References Cited

UNITED STATES PATENTS

| | | | |
|---|---|---|---|
| 2,288,061 | 6/1942 | Arnold | 165—166 |
| 2,506,244 | 5/1950 | Stopka | 165—10 |
| 2,552,937 | 5/1951 | Cohen | 25—156 |
| 2,887,456 | 5/1959 | Halford et al. | 252—477 |
| 2,900,254 | 8/1959 | Raiklen | 75—214 |
| 2,875,501 | 3/1959 | Graveley | 264—59 |
| 2,977,265 | 3/1961 | Forsberg et al. | 154—43 |
| 3,112,184 | 11/1963 | Hollenbach | 264—59 |
| 2,224,810 | 10/1940 | Cumfer | 154—286 |
| 2,251,066 | 7/1941 | Persson et al. | 165—167 |
| 2,526,657 | 10/1950 | Guyer | 252—477 X |
| 2,566,735 | 4/1951 | Lepie | 154—99 |
| 2,636,825 | 4/1953 | Nicholson | 106—44 |
| 2,703,921 | 3/1955 | Brown | 165—141 X |
| 2,730,434 | 1/1956 | Houdry | 252—477 X |
| 2,814,857 | 3/1957 | Duckworth | 106—44 |
| 2,992,981 | 7/1961 | Thomson et al. | 60—108 |

FOREIGN PATENTS 750,303  6/1956  Great Britain.

ROBERT A. O'LEARY, *Primary Examiner.*

CHARLES SUKALO, *Assistant Examiner.*

UNITED STATES PATENT OFFICE
CERTIFICATE OF CORRECTION

Patent No. 3,444,925  May 20, 1969

James R. Johnson

It is certified that error appears in the above identified patent and that said Letters Patent are hereby corrected as shown below:

Column 1, lines 11 and 21, "2,999,061" should read -- 3,079,273 --. Column 8, line 38, "polyethylenue" should read -- polyethylene --. Column 14, line 69, after "bonds" insert -- being --. Column 17, line 75, "realtion" should read -- relation --.

Signed and sealed this 14th day of April 1970.

(SEAL)
Attest:

Edward M. Fletcher, Jr.

Attesting Officer

WILLIAM E. SCHUYLER, JR.

Commissioner of Patents